(12) United States Patent
Kopparapu et al.

(10) Patent No.: US 8,861,708 B2
(45) Date of Patent: Oct. 14, 2014

(54) SYSTEM AND METHOD FOR MONITORING A VOICE IN REAL TIME

(75) Inventors: SunilKumar Kopparapu, Mumbai (IN); Meghna Abhishek Pandharipande, Mumbai (IN)

(73) Assignee: Tata Consulutancy Services Limited (IN)

( * ) Notice: Subject to any disclaimer, the term of this patent is extended or adjusted under 35 U.S.C. 154(b) by 141 days.

(21) Appl. No.: 13/532,937

(22) Filed: Jun. 26, 2012

(65) Prior Publication Data

US 2013/0028399 A1     Jan. 31, 2013

(30) Foreign Application Priority Data

Jul. 28, 2011 (IN) .......................... 2146/MUM/2011

(51) Int. Cl.
*H04M 3/00* (2006.01)
*H04M 5/00* (2006.01)
*H04M 3/51* (2006.01)

(52) U.S. Cl.
CPC ...... *H04M 3/5175* (2013.01); *H04M 2203/357* (2013.01)
USPC ............. 379/265.06; 379/265.07; 379/265.12

(58) Field of Classification Search
USPC .................. 379/266.09, 207, 265.05, 265.12, 379/265.06, 265.07; 704/270
See application file for complete search history.

(56) References Cited

U.S. PATENT DOCUMENTS

| | | | |
|---|---|---|---|
| 2007/0160188 A1* | 7/2007 | Sharpe et al. ............ | 379/265.01 |
| 2008/0107255 A1 | 5/2008 | Geva et al. | |
| 2011/0033036 A1* | 2/2011 | Edwards et al. ......... | 379/265.09 |
| 2011/0202472 A1* | 8/2011 | Wan et al. ..................... | 705/345 |

OTHER PUBLICATIONS

Nice Systems Inc., "Speech Analytics Product and Market Report Reprint;" DMG Consulting LLC, 2010, 14 pp.
Nexidia Inc., "Nexidia to Share Key Insights and Benefits of Real-Time Speech Analytics and Best Practices in Contact Center Operations;" 2010, 2 pp.

* cited by examiner

*Primary Examiner* — Simon King
(74) *Attorney, Agent, or Firm* — Ohlandt, Greeley, Ruggiero & Perle, LLP

(57) ABSTRACT

The invention relates to a system and a method for real-time monitoring and analyses of a conversation of an agent by capturing and processing a plurality of features of the speech of the agent during the conversation with the caller. The system and method further provides a monitoring device for detecting a variation in the conversation, detecting location of the caller and suggesting location specific vocabulary. The system and method also provides an alert engine for transmitting an alert in real-time at the agent console.

12 Claims, 5 Drawing Sheets

SYSTEM AND METHOD FOR MONITORING A VOICE IN REAL TIME

FIELD OF THE INVENTION

The invention relates to a system and a method for monitoring and analyzing a call conversation. More particularly, the invention relates to the system and the method for real-time monitoring and analyzing the conversation in a call center.

BACKGROUND OF THE INVENTION

Call centers are a necessity for most of the business today and they form one of the major interfaces between the customers and the enterprise. With the advent of globalization and development of the telecommunication technology such call centers are often located in location to save cost and hence have to strive hard to ensure customer satisfaction using the local human resources. Since the Customers Service Representatives (Agents) working in such call centers are the primary interfaces to the customers, it is important for the enterprise to ensure that the communication that happens between the customer and agents follows a well defined process and the information is exchanged so that the customer is satisfied. Very often customer is unhappy with the interaction because of cultural differences especially in terms of the speaking rate differences and the use of different vocabulary by the agent, which is alien to the customer.

Several hardware and software based solutions have been developed to monitor and assist human agents (in online and offline environments) in order to ensure that most appropriate information is exchanged effectively in the least possible time. U.S. Pat. No. 6,480,826 issued to Valery A. Pertrushin provides a system and a method for a telephonic emotion detection that provides operative feedback to agent. Although, the system improves the agents' conversation, it inordinately consumes processing time and thus the feedback to the agent is generated after the communication is over, rather than being real-time.

Therefore, there is a need of a system and a method to provide monitoring, analysis and feedback in real-time so that the agent can enhance his performance concurrently during the call itself. Also, the system and the method is needed which is capable of providing an aid to the agent to adapt to linguistic variations in real-time.

OBJECTS OF THE INVENTION

The primary object of the invention is to provide a real-time assistance to monitor and analyze the conversation of the agent with the caller.

Another object of the invention is to provide a system that monitors the speech of the agent and in real-time transmits a visual or audio feedback to the agent to allow him to change the way he speaks.

Yet another object of the invention is to provide a system that allows the agent to receive an instant feedback based on the plurality of features of his speech by way of audio, video or textual alerts.

SUMMARY OF THE INVENTION

A system for real-time monitoring and analysis of a conversation of an agent during a call is disclosed. The system comprises of a signal capturing device configured to capture a speech signal during the conversation of the agent with a caller through an audio interface, a signal processor communicatively coupled with the signal capturing device for processing the speech signal captured by the signal capturing device. The system further comprises of a monitoring device configured to monitor the conversation of the agent with the caller. The monitoring device further comprises of a location detecting module, an evaluation module and an alert engine.

The location detecting module configured to determine a geographic location of the caller, the location detecting module including a computer readable medium for storing and suggesting a location specific vocabulary to be used by the agent with respect to the detected location of the caller. The evaluation module configured to evaluate a plurality of features of the speech signal and to detect a variation in the agent's conversation with respect to a predetermined range and the alert engine for transmitting an alert to the agent locally to bring the conversation under the predetermined range after a variation in the conversation is detected by the evaluation module.

The system further comprises of an agent console communicatively coupled with the monitoring device for real-time performance monitoring and seeking an active real-time aid from the location detecting module, the evaluation module and the alert engine for displaying the location specific vocabulary, the variation in the conversation and the alert transmitted by the alert engine.

A method for real-time monitoring and analyses of a conversation of an agent during a call is also disclosed. The method comprises of capturing a speech signal during the conversation of the agent with the caller and processing the speech signal captured during the conversation of the agent with the caller. The method further comprises of monitoring the conversation of the agent with the caller. The monitoring comprises of detecting a geographic location of the caller during the conversation with the agent and suggesting allocation specific vocabulary with respect to the geographic location of the caller, evaluating a plurality of features of the speech signal and detecting a variation in the conversation with respect to a predetermined range and transmitting an alert to the agent locally after a variation is detected in the conversation. The method further comprises of displaying the suggested list of vocabulary words, the variation detected in the conversation and the alerts transmitted to the agent locally.

DETAILED DESCRIPTION OF THE INVENTION

Some embodiments of this invention, illustrating its features, will now be discussed:

The words "comprising", "having", "containing", and "including", and other forms thereof, are intended to be equivalent in meaning in meaning and be open ended in that an item or items following any one of these words is not meant to be an exhaustive listing of such item or items, or meant to be limited to only the listed item or items.

It must also be noted that as used herein and in the appended claims, the singular forms "a", "an", and "the" include plural references unless the context clearly dictates otherwise. Although any systems, methods, apparatuses, and devices similar or equivalent to those described herein can be used in the practice or testing of embodiments of the present invention, the preferred, systems and parts are now described.

The disclosed embodiments are merely exemplary of the invention, which may be embodied in various forms.

The present invention discloses a system (01) for monitoring and analyses of a conversation. More particularly, the present invention discloses a system (01) for real-time monitoring and analyses of the conversation of an agent during a call.

Figure 1:
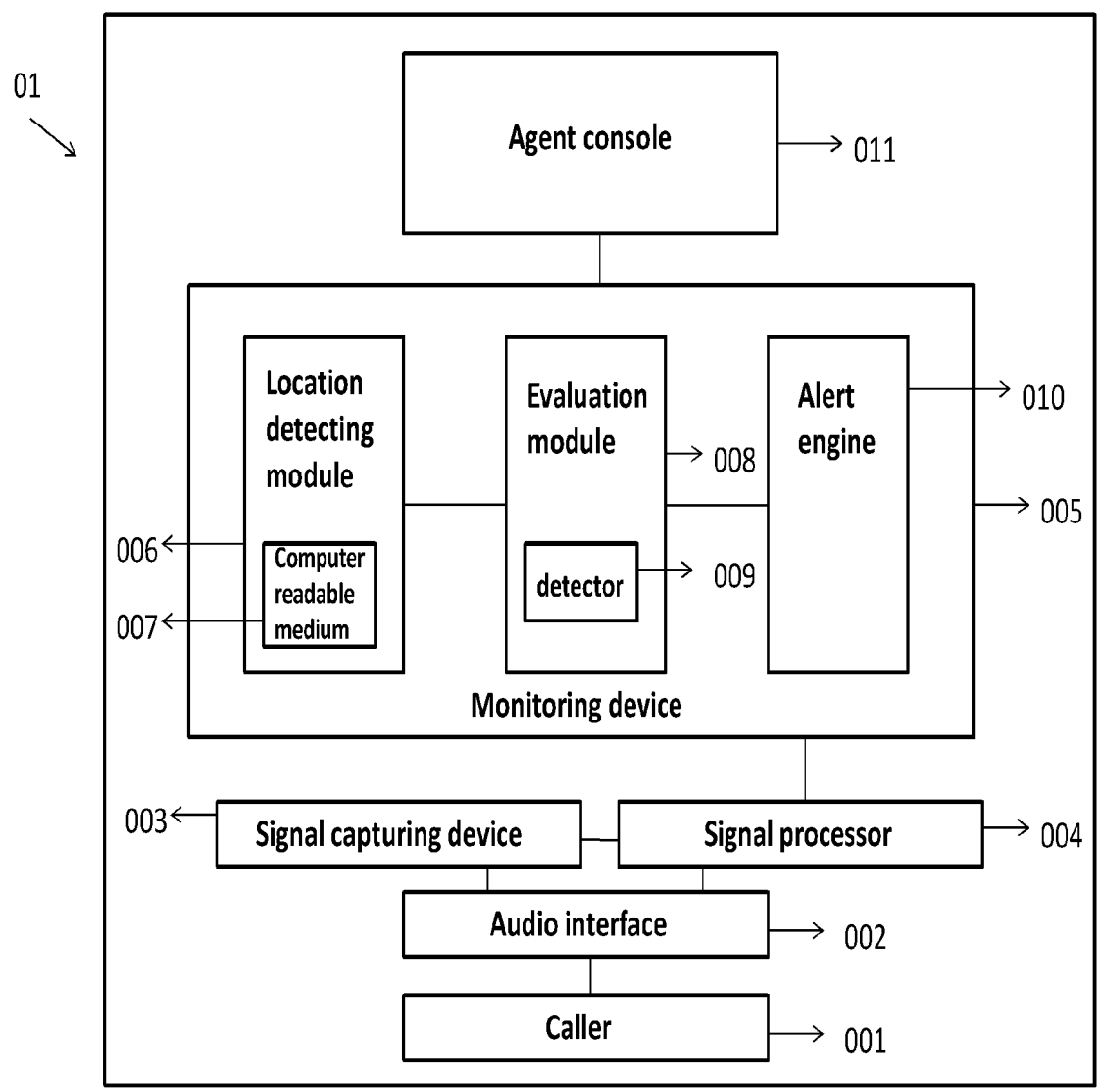
FIG. 1 illustrates the architecture of the system in accordance with an embodiment of the invention.

In accordance with an aspect, referring to FIG. 1, the system (01) comprises of a signal capturing device (003) configured to capture a signal during the conversation of the agent with the caller (001) through an audio interface (002). A signal processor (004) is communicatively coupled to the signal capturing device (003) for processing the signal captured by the signal capturing device (003). The system (01) further comprises of a monitoring device (005) to monitor the conversation of the agent with the caller (001). The monitoring device (005) further comprises of a location detecting module (006), an evaluation module (008) and an alert engine (010). The location detecting module (006) is configured for detecting a geographic location of the caller (001). The location detecting module (006) includes a computer readable medium (007) for storing and suggesting a location specific vocabulary. The agent uses this location specific vocabulary according to the location of the caller (001) detected by the location detecting module (006). The evaluation module (008) is configured to evaluate the speech during the conversation by evaluating a plurality of features of the speech with respect to a predetermined range and then detecting a variation in the agent's conversation. The alert engine (010) is configured for locally transmitting an alert of speech variation to the agent. The system (01) further comprises of an agent console (011) communicatively coupled with the monitoring device (005) for real-time monitoring and seeking an active real-time aid from the location detecting module (006), the evaluation module (008) and the alert engine (010). The agent console (011) further displays the location specific vocabulary, the variation in the conversation and the alert transmitted to the agent.

In accordance with an aspect, still referring to FIG. 1, the present invention also discloses a method for real-time monitoring and analyses of the conversation of the agent with the caller (001). The method comprises of capturing a speech signal through the signal capturing device (003) and processing the signal through the signal processor (004). A monitoring of the conversation is performed through the monitoring device (005). The monitoring further includes detecting the geographic location of the caller through the location detecting module (006) during the conversation with the agent and suggesting the location specific vocabulary with respect to the geographic location of the caller (001). The monitoring also includes evaluating a plurality of features of the speech by the evaluation module (008) and detecting a variation in the conversation with respect to a predetermined range.

After the evaluation is performed, the alerts are transmitted to the agent locally through an alert engine (010) upon detecting a variation in the agents' speech. The method further includes displaying of location specific vocabulary at the agent console (011) so that the words can be selected according to the geographic location of the caller. The speech variation detected and the transmitted alerts are also displayed at the agent console (011).

Figure 2:
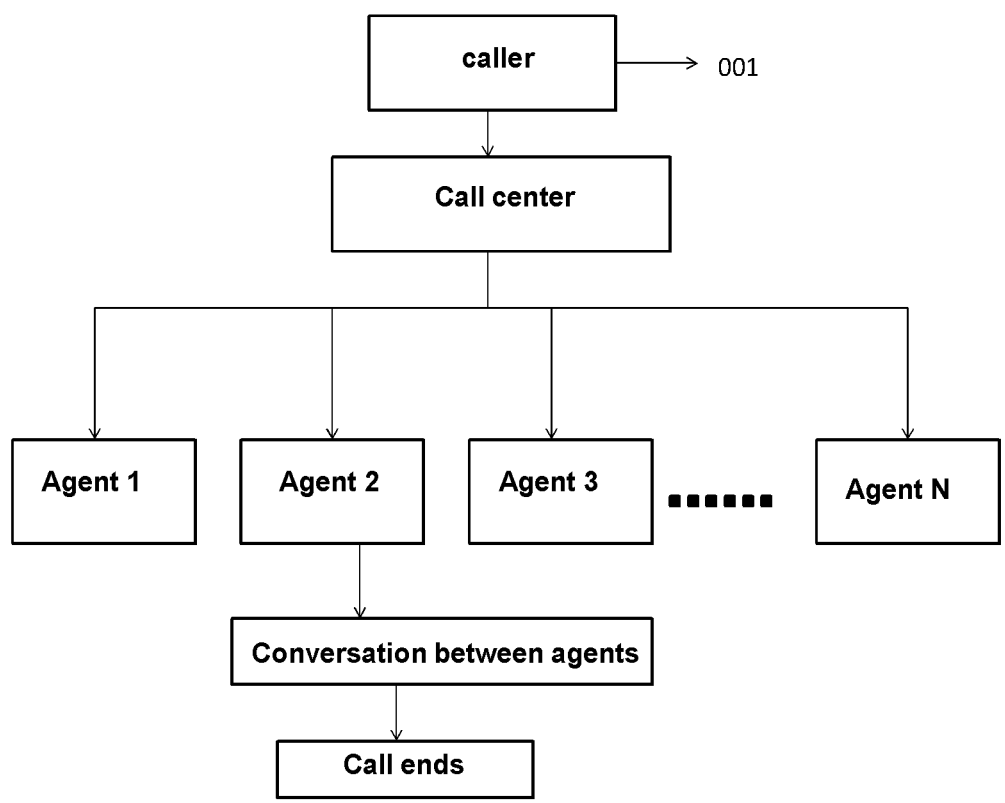
FIG. 2 illustrates the block diagram showing the conversation of the caller with the agent in accordance with an embodiment of the invention.

In accordance with an aspect of the invention, referring to FIG. 2, in a call center scenario when a caller (001) calls using his phone or mobile, one of the agents is either selectively or randomly selected for service delivery to the caller. Caller's (001) call gets connected to one of the N agents of the call center through PBX (Private Branch Exchange) system and IVR (interactive voice response) system and conversation ensues. The agent is provided with a telephone set or head set connected to a telecommunication switch to speak to the caller. The agent has also an access to information relevant to the customer on the agent console (011) which he refers to while conversing with the caller (001).

Figure 3:
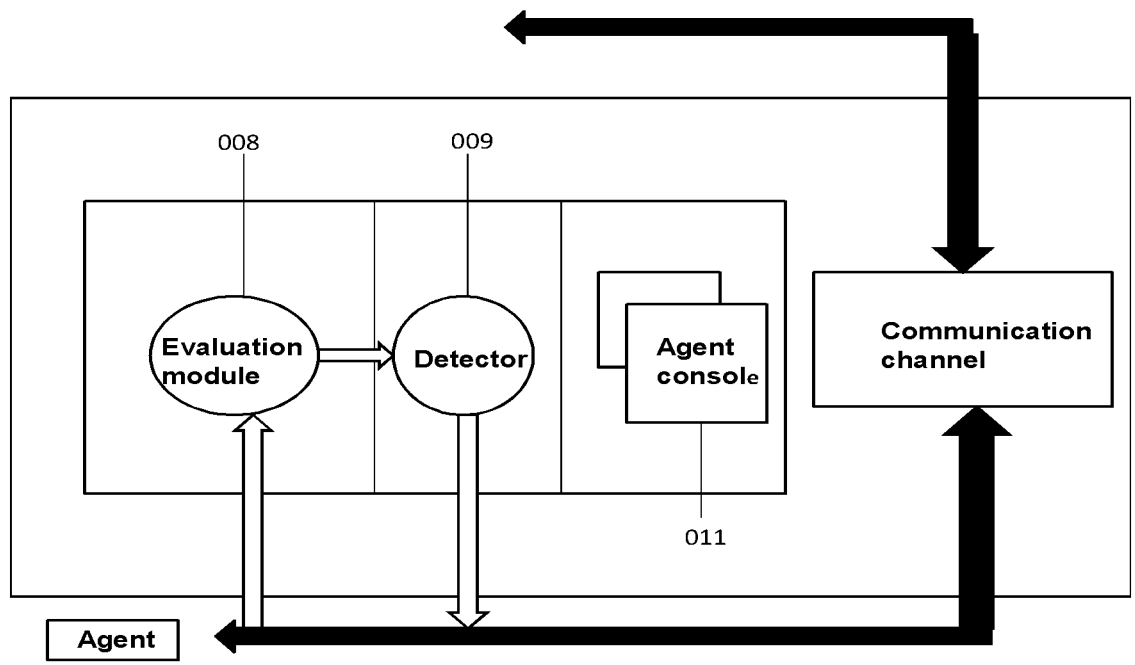
FIG. 3 illustrates the internal characteristics of the conversation of the agent with the caller in accordance with an embodiment of the invention.
Figure 4:
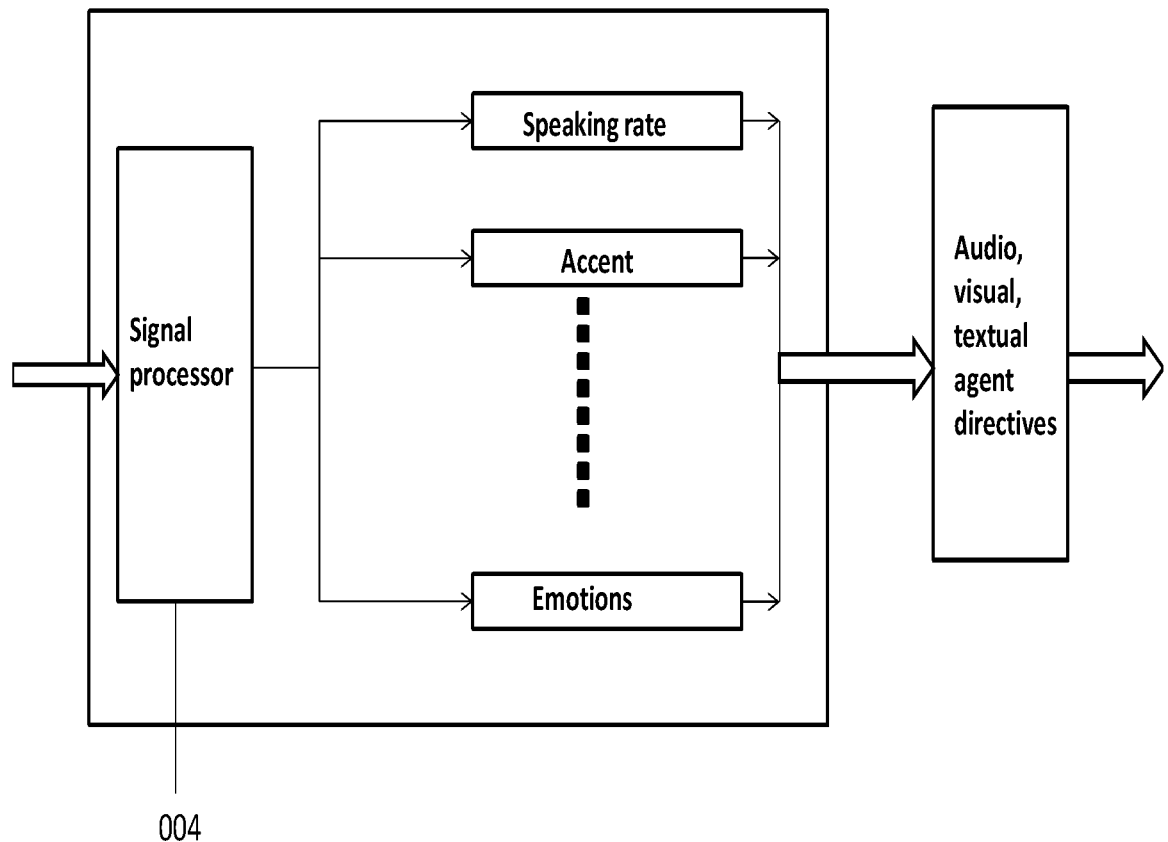
FIG. 4 illustrates the processing of the speech signal in accordance with an alternate embodiment of the invention.

Referring to FIGS. 3 and 4, the agent's system is provided with the speech capturing device (003) for capturing a signal associated to the speech when the agent is in conversation with the caller (001). The signals which are captured by the speech capturing device (002) are transferred to the signal processor (004). The signal processor (004), which may be a module, is communicatively coupled to the signal capturing device (003). The signal processor (004) disintegrates the speech signal in order to obtain a plurality of syllables. The syllable is a unit of organization for a sequence of speech sounds. The plurality of syllables is further used for evaluating a plurality of features of the agent's speech during the conversation with the caller (001).

Figure 5:
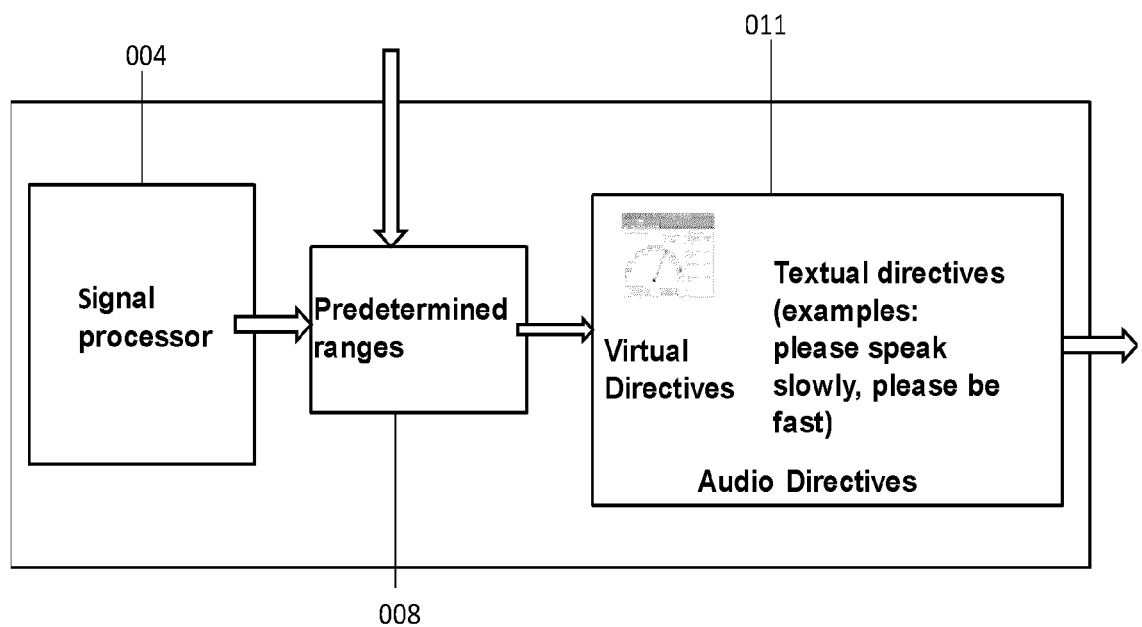
FIG. 5 illustrates the display of audio, visual or textual alerts in accordance with an alternate embodiment of the invention.

After the speech signal is processed through the signal processor (004) the system (01) provides the monitoring device (005) configured to monitor the conversation of the agent with the caller (001). Referring to FIG. 5, the monitoring device (005) is further provided with a location detecting module (006) to determine the geographic location of the caller (001). The determination of geographic location is important in order to make the conversation better by providing a comfortable conversation to the caller (001) with respect to his location. The location detecting module (006) also includes a call mapping system and a telephone call source information system for detecting the geographic location. The location detection module (006) includes a computer readable medium (007) which stores a location specific vocabulary. This location specific vocabulary stores a list of words which should be used with respect to the geographic location detected by the location detecting module (006). The computer readable medium (007) also includes but is not limited to a dictionary for suggesting words with respect to the geographic location. This location specific vocabulary is further displayed at the agent's console (04) and suitable words for a particular geographic location are used by the agent during the conversation.

The monitoring device (005) further comprises of an evaluation module (008) for evaluating the conversation of the agent with the caller (001). The evaluation module (008) further works on the plurality of syllables obtained by the signal processor (004). The evaluation module (008) then recognizes the plurality of features of the speech signal and detects the variation in the conversation.

In accordance with an embodiment, the evaluation module (03) includes a detector (009) which compares the value of the plurality of features of speech to a pre-determined value which is stored in the detector (009). This predetermined value is set locally or manually. The plurality of features includes but is not limited to number of words spoken per unit time, emotional state of the agent and accent used by the agent. By way of specific example, if the agent is speaking loud then the detector (009) compares this value of loudness to the predetermined value and if the range of loudness of the agent's voice during the conversation is beyond the predetermined value then the detector (005) detects this as a variation in the conversation. Likewise, the detector (009) compares words spoken per unit time, emotional state of the agent and the accent used by the agent with the range stored in the detector (009).

The monitoring device (005) further comprises of an alert engine (010) for locally transmitting an alert of the speech variation to the agent. The alert transmitted may be in visual, audio, textual form or a combination thereof. By way of specific example, if the agent is speaking slowly an alert will be displayed at the agent console (011) in the visual form that he is speaking slowly and accordingly the agent will change his way of speaking in order to bring it under the required loudness.

In accordance with an aspect, the agent console (011) is communicatively coupled with the monitoring device (005) and displays locally the variation in the conversation with agent. The variation detected may be displayed by changing the color of the detected area or by blinking it for seeking the agent's attention. The agent is able to view all the variations in the conversation at the agent console (011) in real-time. The agent console (011) further displays the location specific vocabulary provided by the location detecting module (006) of the monitoring device (005). The agent selects the word and uses it with respect to the geographic location detected. The agent console (011) further displays the alert transmitted by the alert engine (010). Once the agent receives the alert, he takes an action with respect to the alert for removing the variation in the conversation.

BEST MODE/EXAMPLE OF WORKING OF THE INVENTION

In a call center scenario, an SRM is configured for capturing a speech and processing the speech of an agent for determining the number of words spoken per unit time. The estimated speaking rate is then non-intrusively (in a visual form or otherwise) feedback to the speaker so that necessary corrective steps can be taken by the speaker to change the speaking rate so that it is within permissible range.

The agent is provided with a desktop a telephone set/ headset connected to a telecommunication switch. A caller who is in need of a service calls up the call center of that company on a telephone channel and gets connected to one of the call center agents. The agent typically has a desktop which pops up some relevant information about the caller which the agent can use to converse with the caller for resolving his queries.

During a typical conversation with the caller, there is a large variability in the speaking rate of the agent and very often it is involuntary and unknown to the agent. The invention allows real time analysis on the spoken speech of the agent and gives an instant feedback in the form of a visual/audio alert on the desktop of the agent. This alert can sensitize the agent to lower the speaking rate or increase the speaking rate deepening on if he is is speaking fast or speaking slow. This gives the agent an opportunity to speaking at a permissible rate allowing the agent to converse in a comprehensible manner.

The real time speaking rate monitoring (SRM) system resides on the desktop of the agent and taps into the speech of the agent as he is communicating with the caller. While the call conversation between the agent and the caller is in progress on the telephone channel, the agents speech is simultaneously and in real time passed to the system on the desktop. The SRM extracts the syllables in the agent spoken speech and conveys the speaking rate to the agent on his/her desktop. The speaking rate can be updated at a predefined interval of time (typically every 1 sec) as a discrete visual cue.

We claim:

1. A system for real-time monitoring and analysis of a conversation of an agent during a call, the system comprising:
    a signal capturing device configured to capture a speech signal during the live conversation between the agent and a caller through an audio interface;
    a signal processor communicatively coupled with the signal capturing device for processing the speech signal captured by the signal capturing device;
    a monitoring device configured to monitor the conversation of the agent with the caller; the monitoring device further comprising:
        a location detecting module configured to determine a geographic location of the caller, the location detecting module including a computer readable medium for storing and suggesting a location specific vocabulary to be used by the agent with respect to the detected location of the caller;
        an evaluation module configured to evaluate a plurality of features of the speech signal and to detect a variation in the agent's conversation with respect to a predetermined range; and
        an alert engine for transmitting an alert to the agent locally to bring the conversation under the predetermined range after a variation in the conversation is detected by the evaluation module; and
    an agent console communicatively coupled with the monitoring device for real-time performance monitoring and seeking an active real-time aid from the location detecting module, the evaluation module and the alert engine for displaying the location specific vocabulary, the variation in the conversation and the alert transmitted by the alert engine.

2. The system as claimed in claim 1, wherein the system further comprises of a central server to store the conversation of the agent with the caller for an offline analysis thereof.

3. The system as claimed in claim 1, wherein the evaluation module includes a detector for detecting the variation in the conversation with respect to the predetermined range, the predetermined range is set locally.

4. The system as claimed in claim 1, wherein the alert transmitted by the alert engine is in visual form, audio form, textual form or a combination thereof.

5. The system as claimed in claim 1, wherein the location detecting module includes a call mapping system and a telephone call source information system.

6. A method for real-time monitoring and analyses of a conversation of an agent during a call, the method comprising:
    capturing by a signal-capturing device a speech signal during the conversation of the agent with a caller;
    processing the speech signal captured during the conversation of the agent with the caller;
    monitoring by a monitoring device the conversation of the agent with the caller, the monitoring further comprising:
        detecting a geographic location of the caller during the conversation with the agent and suggesting allocation specific vocabulary with respect to the geographic location of the caller;

evaluating a plurality of features of the speech signal and detecting a variation in the conversation with respect to a predetermined range; and transmitting an alert to the agent locally after a variation is detected in the conversation; and displaying the suggested list of vocabulary words, the variation detected in the conversation and the alerts transmitted to the agent locally.

7. The method as claimed in claim 6, wherein the processing of the speech signal determines the plurality of features including number of words spoken per unit time, emotional state and accent used by the agent during the conversation.

8. The method as claimed in claim 6, wherein the variation in the conversation is visually displayed by highlighting it with change in color or with a blink.

9. The method as claimed in claim 6, wherein the alert is transmitted to allow the agent to modify the accent, speaking rate, loudness or emotional rate or a combination thereof with respect to the predetermined rate.

10. The system as claimed in claim 1, wherein the processing of the speech signal determines the plurality of features including number of words spoken per unit time, emotional state and accent used by the agent during the conversation.

11. The system as claimed in claim 1, wherein the variation in the conversation is visually displayed by highlighting it with change in color or with a blink.

12. The system as claimed in claim 1, wherein the alert is transmitted to allow the agent to modify the accent, speaking rate, loudness or emotional rate or a combination thereof with respect to the predetermined rate.

* * * * *

UNITED STATES PATENT AND TRADEMARK OFFICE
CERTIFICATE OF CORRECTION

| | | |
|---|---|---|
| PATENT NO. | : 8,861,708 B2 | Page 1 of 1 |
| APPLICATION NO. | : 13/532937 | |
| DATED | : October 14, 2014 | |
| INVENTOR(S) | : Kopparapu et al. | |

It is certified that error appears in the above-identified patent and that said Letters Patent is hereby corrected as shown below:

Title Page "Assignee":

Item (73) – please correct: "Tata Consulutancy Services Limited (IN)" to -- Tata Consultancy Services Limited (IN) --.

Signed and Sealed this
Seventeenth Day of February, 2015

Michelle K. Lee
*Deputy Director of the United States Patent and Trademark Office*